US007892095B2

(12) United States Patent
Caffrey

(10) Patent No.: US 7,892,095 B2
(45) Date of Patent: Feb. 22, 2011

(54) DISPLAYING INFORMATION TO A SELECTED PLAYER IN A MULTI-PLAYER GAME ON A COMMONLY VIEWED DISPLAY DEVICE

(75) Inventor: Michael S. Caffrey, Kirkland, WA (US)

(73) Assignee: Screenlife, LLC, Seattle, WA (US)

( * ) Notice: Subject to any disclaimer, the term of this patent is extended or adjusted under 35 U.S.C. 154(b) by 717 days.

(21) Appl. No.: 11/674,571

(22) Filed: Feb. 13, 2007

(65) Prior Publication Data

US 2008/0194331 A1 Aug. 14, 2008

(51) Int. Cl.
*A63F 13/00* (2006.01)
(52) U.S. Cl. .................... 463/31; 463/9; 463/33; 463/43
(58) Field of Classification Search ............. 463/31, 463/33, 36, 37, 39, 40, 43, 9
See application file for complete search history.

(56) References Cited

U.S. PATENT DOCUMENTS

| | | | |
|---|---|---|---|
| 4,940,239 A | 7/1990 | Tuttle | |
| 4,944,519 A | 7/1990 | Canela | |
| 5,120,230 A | 6/1992 | Clark | |
| 5,121,928 A | 6/1992 | Salerno-Sonneberg | |
| 5,145,184 A | 9/1992 | Yearick | |
| 5,255,923 A | 10/1993 | Bennett | |
| 5,393,071 A | 2/1995 | Best | |
| 5,393,072 A | 2/1995 | Best | |
| 5,393,073 A | 2/1995 | Best | |
| 5,472,207 A | 12/1995 | Sullivan, Jr. | |
| 5,613,909 A | 3/1997 | Stelovsky | |
| 5,643,084 A | 7/1997 | Mirsky | |
| 5,697,844 A * | 12/1997 | Von Kohorn | 463/40 |
| 5,734,788 A | 3/1998 | Nonomura | |
| 5,782,692 A | 7/1998 | Stelovsky | |
| 5,929,857 A | 7/1999 | Dinallo | |
| 5,933,569 A | 8/1999 | Sawabe | |

(Continued)

FOREIGN PATENT DOCUMENTS

EP 1 147 793 A2 10/2001

(Continued)

OTHER PUBLICATIONS

Taylor, J., "DVD Demystified," 2d ed., McGraw-Hill, New York, 2001, Chap. 6, "Application Details: DVD-Video and DVD-Audio," and Chap. 7, "What's Wrong With DVD," pp. 250-352.

(Continued)

*Primary Examiner*—James S McClellan
(74) *Attorney, Agent, or Firm*—Christensen O'Connor Johnson Kindness

(57) ABSTRACT

A method and system for presenting specific information to a selected player in a multi-player game on a commonly viewed display device is presented. The method and system comprise receiving a request for information. Typically, this request comes from the selected player. Subsequently, input identifying one of a plurality of display locations for displaying the requested information on the commonly viewed display device is obtained. Thereafter, a plurality of responses, including the requested information, are output for display on the display device, wherein the requested information is output for display at the identified display location.

19 Claims, 10 Drawing Sheets

U.S. PATENT DOCUMENTS

| | | | | |
|---|---|---|---|---|
| 5,986,200 | A | 11/1999 | Curtin | |
| 5,999,698 | A | 12/1999 | Nakai | |
| 6,065,006 | A | 5/2000 | deCarmo | |
| 6,085,021 | A | 7/2000 | Tozaki | |
| 6,122,434 | A | 9/2000 | Sawabe | |
| 6,133,920 | A | 10/2000 | deCarmo | |
| 6,138,175 | A | 10/2000 | deCarmo | |
| 6,159,014 | A | 12/2000 | Jenkins | |
| 6,201,928 | B1 | 3/2001 | Nonomura | |
| 6,215,952 | B1 | 4/2001 | Yoshio | |
| 6,229,523 | B1 | 5/2001 | Czako | |
| 6,229,952 | B1 | 5/2001 | Nonomura | |
| 6,243,328 | B1 | 6/2001 | Fenner | |
| 6,256,730 | B1 | 7/2001 | deCarmo | |
| 6,272,625 | B1 | 8/2001 | deCarmo | |
| 6,356,703 | B1 | 3/2002 | Nonomura | |
| 6,356,914 | B1 | 3/2002 | deCarmo | |
| 6,381,314 | B1 | 4/2002 | Walinski | |
| 6,381,404 | B1 | 4/2002 | deCarmo | |
| 6,434,326 | B1 | 8/2002 | Kondo | |
| 6,493,503 | B2 | 12/2002 | Nonomura | |
| 6,496,981 | B1 | 12/2002 | Wistendahl | |
| 6,504,649 | B1* | 1/2003 | Myers | 359/454 |
| 6,526,223 | B1 | 2/2003 | Mori | |
| 6,529,683 | B2 | 3/2003 | Mori | |
| 6,553,180 | B1 | 4/2003 | Kikuchi | |
| 6,564,006 | B1 | 5/2003 | Mori | |
| 6,567,608 | B2 | 5/2003 | Mori | |
| 6,567,979 | B1 | 5/2003 | deCarmo | |
| 6,574,419 | B1 | 6/2003 | Nonomura | |
| 6,594,212 | B2 | 7/2003 | Kimura | |
| 6,643,450 | B1 | 11/2003 | deCarmo | |
| 6,650,827 | B1 | 11/2003 | Ogikubo | |
| 6,708,334 | B1 | 3/2004 | deCarmo | |
| 6,758,754 | B1 | 7/2004 | Lavanchy | |
| 6,760,915 | B2 | 7/2004 | deCarmo | |
| 6,761,635 | B2 | 7/2004 | Hoshino | |
| 6,807,368 | B1 | 10/2004 | deCarmo | |
| 6,816,667 | B1 | 11/2004 | deCarmo | |
| 6,987,925 | B2 | 1/2006 | Kinzer | |
| 7,496,086 | B2 | 2/2009 | Eckberg | |
| 2002/0010026 | A1* | 1/2002 | York | 463/47 |
| 2002/0097984 | A1* | 7/2002 | Abecassis | 386/70 |
| 2003/0054877 | A1 | 3/2003 | Baerlocher | |
| 2003/0190961 | A1 | 10/2003 | Seidman | |
| 2004/0014524 | A1 | 1/2004 | Pearlman | |
| 2004/0048642 | A1 | 3/2004 | Kinzer | |
| 2004/0239028 | A1* | 12/2004 | Schnitman et al. | 273/146 |
| 2004/0240861 | A1 | 12/2004 | Yeend | |
| 2005/0008338 | A1 | 1/2005 | Yamauchi | |
| 2005/0008348 | A1 | 1/2005 | Collar | |
| 2005/0014563 | A1 | 1/2005 | Barri | |
| 2005/0075166 | A1 | 4/2005 | Hemstreet | |
| 2005/0215324 | A1* | 9/2005 | Lippincott | 463/43 |
| 2005/0227764 | A1* | 10/2005 | Cantu et al. | 463/37 |
| 2006/0044216 | A1* | 3/2006 | Love | 345/1.3 |
| 2006/0246988 | A1 | 11/2006 | Walker | |
| 2007/0066404 | A1* | 3/2007 | Leong et al. | 463/43 |
| 2007/0205912 | A1* | 9/2007 | Lane et al. | 340/825.72 |
| 2008/0268955 | A1* | 10/2008 | Spittle | 463/37 |

FOREIGN PATENT DOCUMENTS

| | | |
|---|---|---|
| EP | 1 180 385 A2 | 2/2002 |
| GB | 2 219 217 A | 12/1989 |
| JP | 05-199415 A | 2/1993 |
| JP | 07-320458 A | 12/1995 |
| JP | 10-283761 A | 10/1998 |
| JP | 11-151357 A | 6/1999 |
| JP | 2000-306371 A | 11/2000 |
| JP | 2003-536299 A | 12/2003 |
| WO | 90/00429 A1 | 1/1990 |
| WO | 97/34671 A1 | 9/1997 |
| WO | 02/20108 A2 | 3/2002 |

OTHER PUBLICATIONS

"DVD Frequently Asked Questions (and Answers)," DVD Demystified: Home of the DVD FAQ, Jan. 4, 2008, <http://www.dvddemystified.com/dvdfaq.html> [retrieved Apr. 18, 2008], pp. 1-5 and 8-10.

LaBarge, R., "DVD Authoring & Production: An Authoritative Guide to DVD-Video, DVD-ROM, & WebDVD," CMP Books, Lawrence, Kansas, 2001, Chap. 2, "DVD Format Specifications," pp. 7-9, 16-18, and 36-38.

Taylor, J., "DVD Demystified," 2nd ed., McGraw-Hill, New York, 2001, Chap. 1, "What is DVD?" pp. 4-5.

"Digital Leisure Releases Dragon's Lair DVD-Video; One of the Best Selling Arcade Games of All Time Now Available for DVD Movie Players," Business Wire, Nov. 6, 1998, HighBeam Research (online), <www.highbeam.com/doc/1G1-53183585.html> [retrieved Sep. 10, 2010], 1 page.

\* cited by examiner

1. William Shakespeare
   A Midsummer Night's Dream

2. Ernest Hemingway
   The Old Man and the Sea

3. Mark Twain
   Huckleberry Finn

4. Victor Hugo
   Le Miserables

5. Charles Dickens
   A Tale of Two Cities

6. Emily Bronte
   Wuthering Heights

7. Joseph Conrad
   Lord Jim

8. Homer
   The Odyssey

9. Leo Tolstoy
   War and Peace

10. Jane Austen
    Pride and Prejudice

Press Enter to Continue ...

*Fig.3A.*

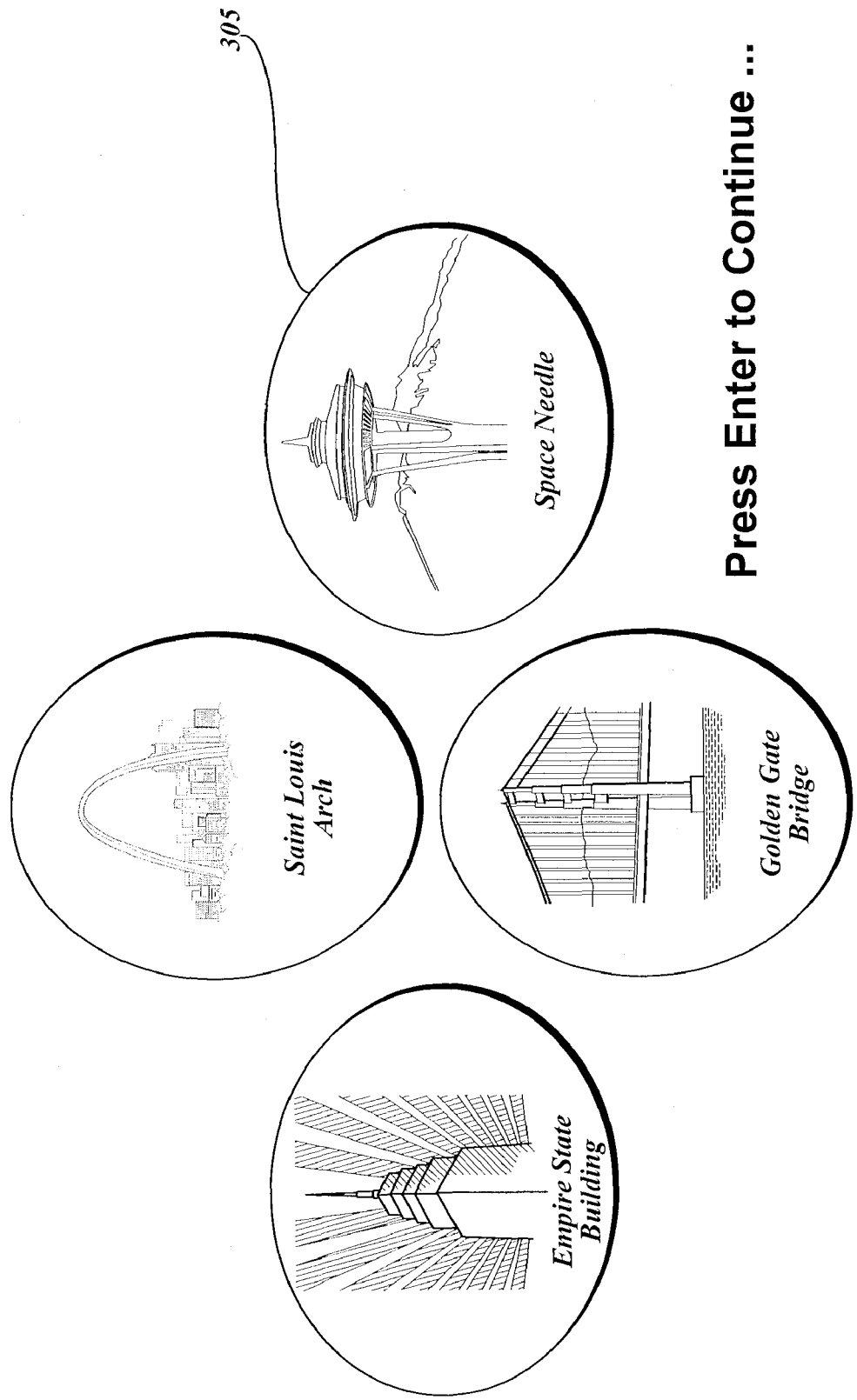

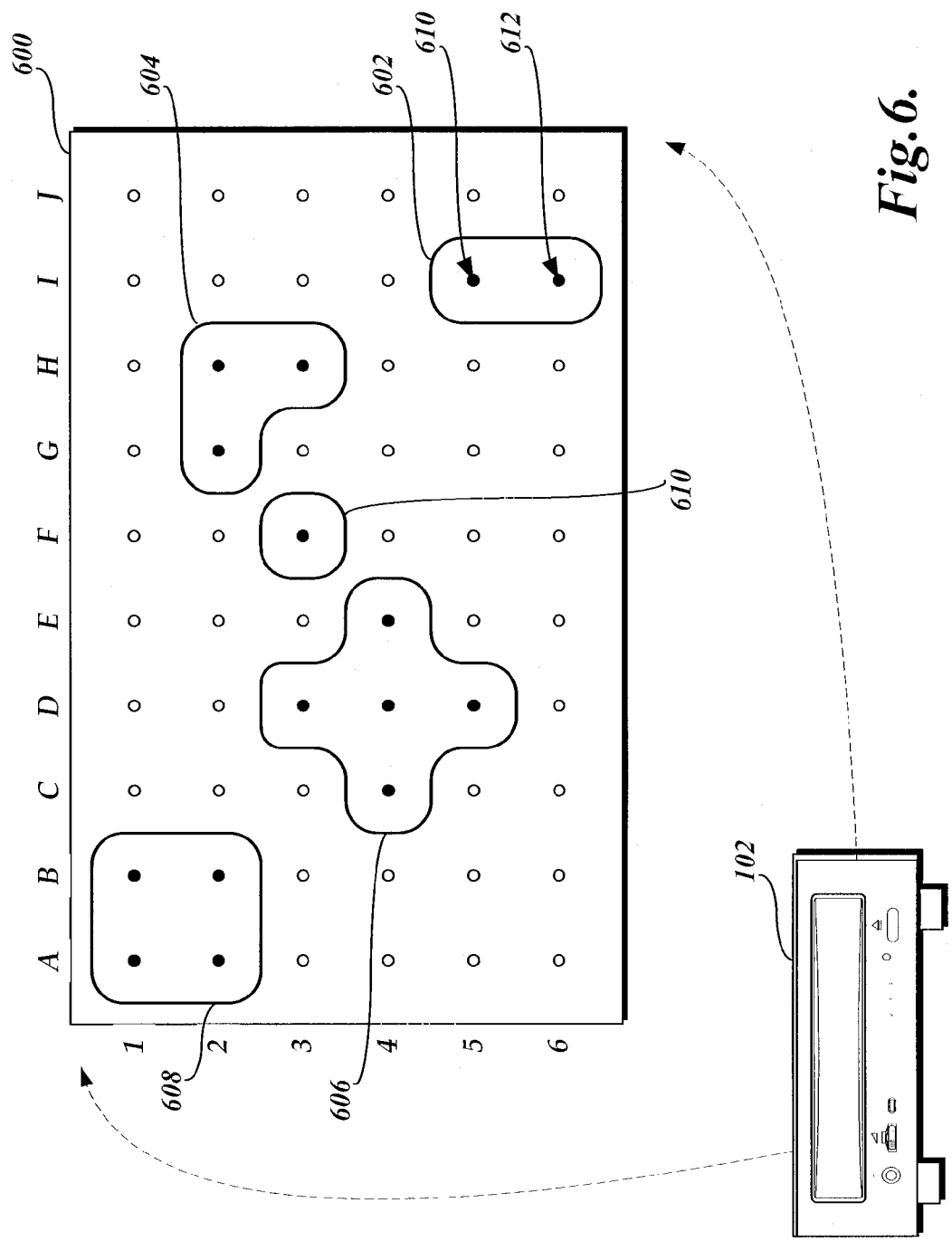

DISPLAYING INFORMATION TO A SELECTED PLAYER IN A MULTI-PLAYER GAME ON A COMMONLY VIEWED DISPLAY DEVICE

FIELD OF THE INVENTION

The present invention relates generally to a game and, more particularly, relates to a system and method for displaying information to a selected player in a multi-player game on a commonly viewed display device.

BACKGROUND

In the past, video cassette recorders were used to display videos on a television set. DVD (digital video disc) video players soon replaced the video cassette recorders. DVD video players had the advantage over video cassette players in that DVD video players could quickly and accurately access and display specific segments of data from anywhere on a DVD. Viewers typically controlled the display of content by a DVD video player using a remote control.

Quite recently, content providers have begun to offer interactive games that are played on a DVD video player. In one example, an interactive DVD video game randomly selects and outputs movie clips, images, and/or audio clips stored on a DVD and then asks a question related to the output content. A selected player then answers the question, sometimes through a remote control associated with the DVD video player or through control buttons located on the DVD video player. Subsequently, the DVD video player outputs the correct answer, typically on an associated display device where all players can view the answer. Depending on the correctness of the player's answer, the selected player might move forward in the game. When the selected player's "turn" is over, another player is selected, i.e., it is his turn and the process repeats. Of course, this process is be repeated until one player wins the game.

As mentioned above, in the illustrative game, the correct answers to the questions or puzzles are typically output on a display device (e.g., a television) which is commonly viewed by all players. Since answers are shown to all participants in the game, content providers have not been able to provide DVD video games that can present specific information to a single player in a multi-player game. In other words, content providers proceeded with the notion that specific information intended for a selected player could not be presented on a commonly viewed display device without the information being universally known by the other players viewing the display.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method for presenting specific information to a selected player in a multi-player game on a commonly viewed display device is presented. The method comprises, as a first step, receiving a request for information. Typically, this request comes from the selected player. Subsequently, input identifying one of a plurality of display locations for displaying the requested information on the commonly viewed display device is obtained. Thereafter, a plurality of responses, including the requested information, are output for display on the display device, wherein the requested information is output for display at the identified display location.

According to another embodiment, a game system is presented. The game system comprises a media player and a media player-readable medium. The media player is coupled to a display device that is simultaneously viewable by a plurality of players. The media player-readable medium includes an executable component for execution on the media player such that when executed on the media player, the media player is configured to carry out the following steps of a multi-player game. As one step, a request for information is received from a selected player. The selected player is one of a plurality of players commonly viewing the above-mentioned display device. As another step, input is obtained from the selected player specifying one of a plurality of display locations on the display device for outputting the requested information. As yet another step, a plurality of responses are output for display on the display device. Each response is output for display at a different display location on the display device, including the requested information which is output for display at the specified display location.

According to yet another embodiment, a tangible readable medium containing executable instructions suitable for execution on a media player is presented. The executable instructions, when executed, configure the media player to perform the following functional steps. As a first step, the media player receives a request for information to be displayed on a display device. The display device is commonly viewed by a plurality of players. As another step, the media player obtains input from a selected player, of the plurality of players, identifying one of a plurality of display locations on the display device for outputting the information to the selected player. As yet another step, the media player outputs for display a plurality of responses to the display device. Each response is output to the display device for display at a different display location The output responses include the requested information output for display at the specified display location.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 3A and 3B are pictorial diagrams illustrating exemplary display screens displaying requested specific information according to a display indication from a selected player;

FIG. 6 is a pictorial diagram illustrating an exemplary grid with various targets placed in that grid for the players to locate.

DETAILED DESCRIPTION

As used in the following discussion, "DVD" generally refers to the optical disc storage technology also known as "Digital Video Disc" and more recently as "Digital Versatile Disc." A "DVD disc" refers to an optical disc conforming to the DVD Video format, as defined by the international DVD Forum group, designed for presenting audio/visual content to a display device via a DVD Video player. While DVD discs and the associated technology provide substantial storage capacity with relatively fast random access time, it should be appreciated that aspects of the present invention may suitably use any number of media configurations including, but not limited to, Blu-ray discs, HD DVD discs, USB thumb-drives, removable hard drives, and the like.

As used in the following discussion, "clips" refers to the visual and/or auditory content that is located on media, such as a DVD disc, for presentation during the playing of a game. These clips constitute the various questions and responses output by the media player to the display device.

As suggested above, a "DVD Video player" refers to a typical "set-top" device for outputting content stored on a DVD disc according to the DVD Video standard. As those skilled in the art will appreciate, a DVD Video player has limited memory, typically sixteen or fewer 32-bit registers and provides only limited programming features, typically embedded within the content stored on the DVD disc.

According to aspects of the present invention, specific information can be presented by a DVD Video player, or a media player in general, to a selected player on a commonly viewed display device. The selected player to whom the specific information is to be directed indicates a location on the display device where the specific information is to be displayed. Ideally, the player makes this indication in a manner such that the location is kept secret from the other players. The DVD video player receives the input from the selected player and displays the specific information on the display device at the indicated location. In addition to displaying the specific information directed to the selected player, other information is also displayed on the display device. This other information is displayed to provide uncertainty to the other players as to what is the response (i.e., the specific information directed to the selected player) from the game system.

Figure 1A:
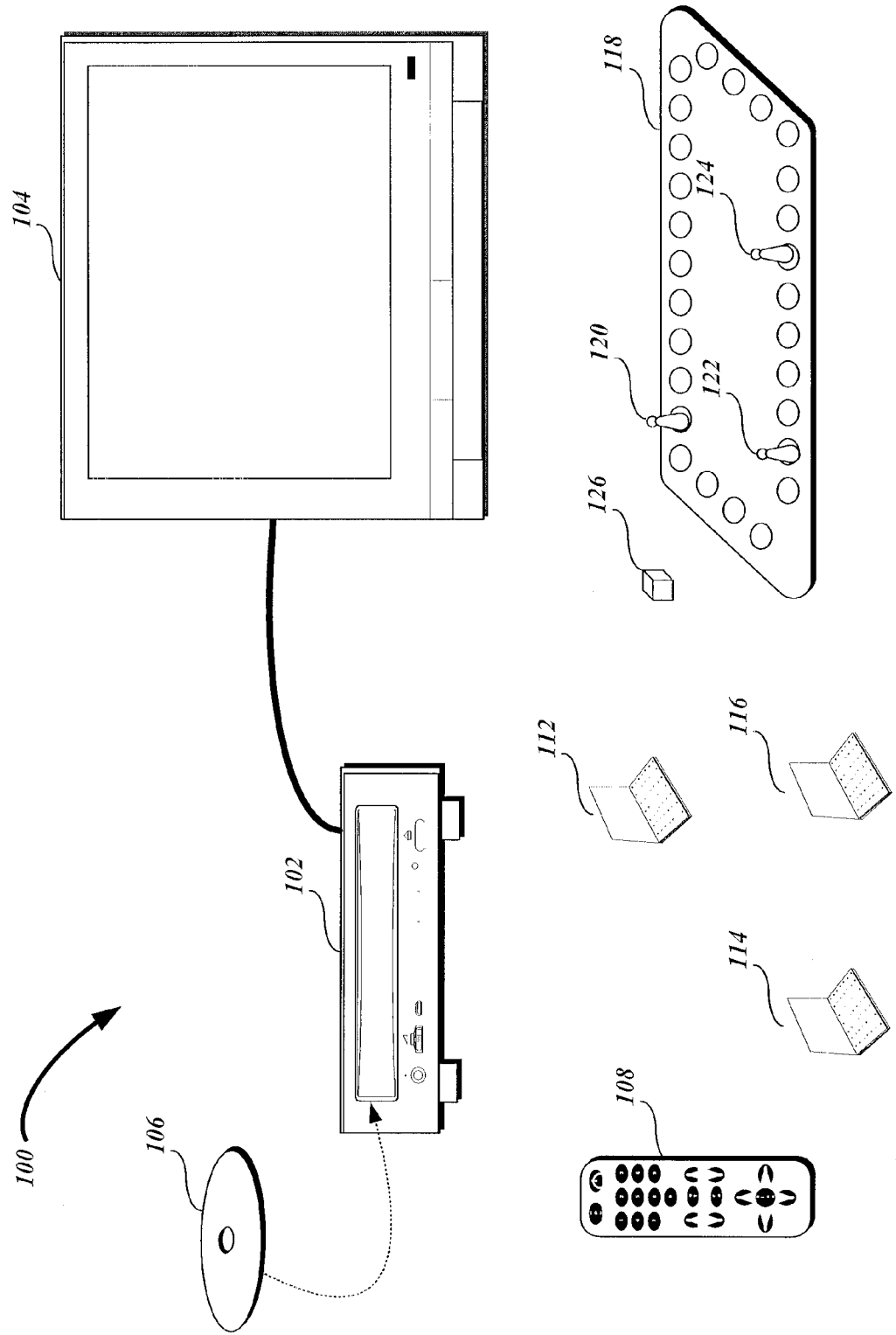
FIGS. 1A and 1B are pictorial diagrams of illustrative DVD game systems suitable for presenting specific information to a selected player on a commonly viewed display device.
Figure 1B:
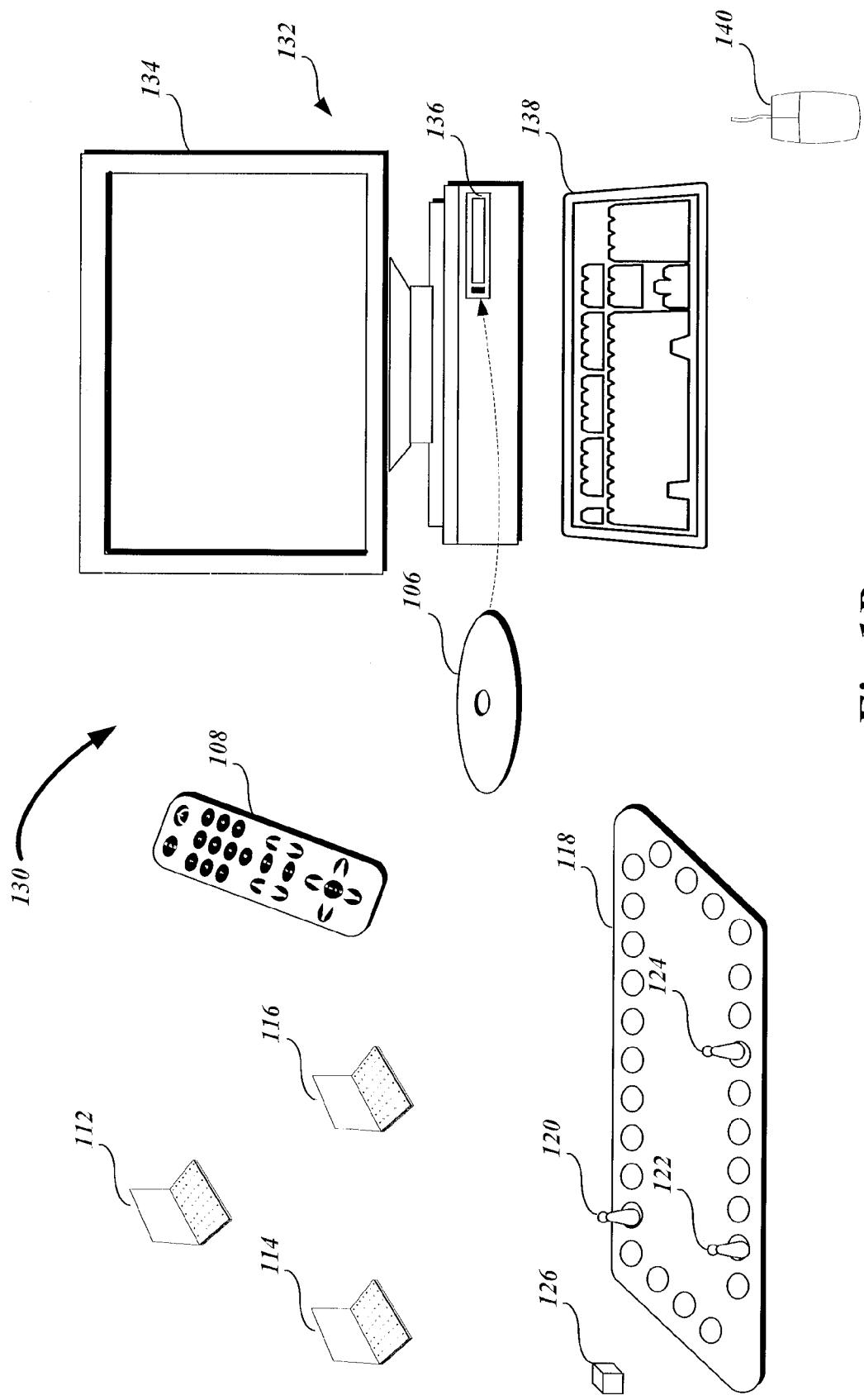

In regard to presenting specific information to a selected player on a commonly viewed display device, FIGS. 1A and 1B are pictorial diagrams of illustrative DVD game systems suitable for presenting specific information to a selected player on a commonly viewed display device. Of course, while the various game systems of FIGS. 1A and 1B are illustrated as parlor-type game systems, and described herein as a parlor-type game, it is to be understood that the game could also take the form of an educational, training, or promotional tool. Thus, as used herein, "game," like "clip," should be construed as illustrative only, not limiting upon the present invention.

With regard to FIG. 1A, the illustrative game system 100 includes a DVD Video player 102 connected to a commonly viewed display device 104. The game system 100 also includes a DVD disc 106 storing a plurality of clips to be output when playing a game.

As an optional item, though frequently included with a DVD Video player 102, the game system 100 is illustrated as including a remote control 108. The remote control 108 enables a selected player to control aspects of a game, including directing the DVD Video player 102 to output response information on the display device 104 in a location specified by the player through the remote control.

A remote control 108 is an optional item to the game system 100 only when the DVD Video player 102 includes other controls, such as controls located on the front of the DVD Video player, that enable a selected player to interact with the game system in order to specify one of a plurality of display locations for displaying a correct response, and more generally for interacting with the portion of a game presented on the commonly viewed display device 104.

Other items that may be optionally included with a game implemented on a media player connected to a commonly viewed display device, such as game system 100, would be recording aids, such as printed notepads, onto which each player may record information that that player believes to be the correct answer. For example, FIG. 1A illustrates three notepads 112-116 for use by players in the course of a game. If provided as part of a game, the notepads will typically include printed material tailored to the game for assisting each player to record relevant information regarding the play of the game, such as grids, tables, lists of data, and the like. As each player may wish to maintain secret the information he/she has learned during the play of a game, the notepads, such as notepads 112-116, will typically also be used in conjunction with a cover, as shown in FIG. 1A.

Additionally, other optional items may include a game board, such as game board 118 and player pieces 120-124 which are intended to direct questions according to particular locations. One or more dice, such as die 126, may optionally be used to limit each player's movement around the game board.

While the following discussion will generally be made in terms of outputting content stored on a DVD disc via a DVD Video player to a commonly viewed display device, it should be appreciated that aspects of the present invention may be suitably applied to a number of media players. More particularly, aspects of the present invention could be suitably adapted to run on any media player system that displays content on a commonly viewed display device. For example, FIG. 1B is a pictorial diagram illustrating an alternative game system 130 suitable for presenting information to a specific player on a commonly viewed display device.

As shown in FIG. 1B, the exemplary game system 130 includes a personal computer 132 connected to, or including, a display device 134. The personal computer 132 includes a computer-readable media drive 136 for presenting the clips stored in game supplied media, such as a DVD disc 106. Additionally, the illustrative game system 130 optionally includes the various notepads 112-116 as described above in regard to FIG. 1A, as well as the game board 118, player pieces 120-124, and die 126. The illustrative game system 130 also optionally includes a remote control 108. However, as a common alternative in a game system 130 including a personal computer, a player will interact with the personal computer 132 via a keyboard 138 or a mouse 140.

While not shown in either FIG. 1A or 1B, a suitable game system also typically includes at least one speaker through which the DVD Video player 102 may play audio clips. Of course, as an alternative, the exemplary game systems 100 and 130 could include external speakers connected either to the DVD Video player 102 or the display device 104.

As already mentioned, to obtain specific information for the selected player, the selected player provides location information to the DVD Video player 102 that identifies one of a plurality of display locations for displaying the specific information. A remote control 108 may be advantageously used for providing location information to the DVD Video player 102 for presenting specific information to the selected user since it can be easily passed among the various players and the selected player's selection (via a button) can be easily obscured from other players.

Figure 2:
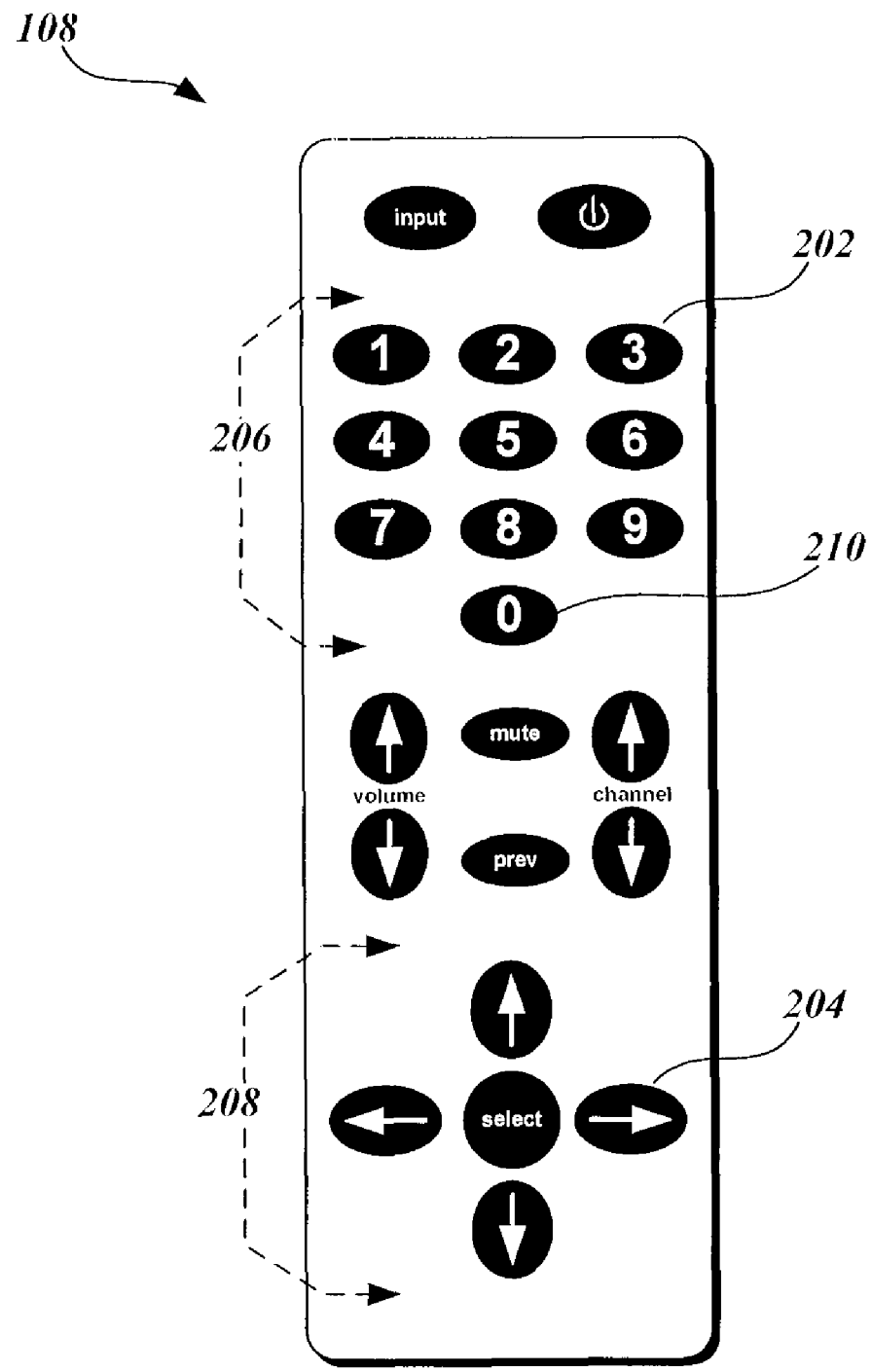
FIG. 2 is a pictorial diagram of an illustrative remote control including player-actionable buttons suitable for selecting one of a plurality of display locations for presenting specific information to a selected player on a commonly viewed display device.

FIG. 2 is a pictorial diagram of an illustrative remote control 108 including player-actionable buttons suitable for selecting one of a plurality of display locations for presenting specific information to a selected player on a commonly viewed display device 104. As those skilled in the art will appreciate, pressing a player-actionable button on the remote control 108 causes the remote control to transmit information associated with that button to the DVD Video player 102. As recognized by those skilled in the art, the DVD video player 102 and remote control 108 typically, though not exclusively, communicate this information via IR (infrared) technology. Thus, when a player-actionable button, such as button 202, is pressed, a series of short pulses of infrared light are sent by the remote control 108 to the DVD player 102. The remote control 108 is typically configured to send a unique series of infrared pulses for each player-actionable button located thereon. Correspondingly, the DVD video player 102 receives the pulses of infrared light. The DVD video player 102 decodes the infrared signal and determines the specific action button manipulated by the user. Of course, relying instead on a selected player manipulating a control located on the DVD video player 102, the DVD video player logically interprets the manipulation of these controls in the same manner as if it received input from the remote control 108.

As those skilled in the art will appreciate, a typical remote control 108 includes one or more sets of player-actionable buttons which may be advantageously used to specify a display location for displaying information to the selected player. As shown in FIG. 2, the illustrated remote control 108 includes two sets of player-actionable buttons, 206 and 208, which correspond to numbers and directional buttons.

In using the numbers set 206 of player-actionable buttons, the selected player specifies the number for a correct response among a list of responses. For example, the selected player may request specific information be displayed as item 3 in a list of items from 1 to 10 by pressing button 202. Correspondingly, as shown in FIG. 3A, the DVD video player 102 outputs various responses to the display device 104 including the requested specific information at item number 303.

Also illustrated in FIG. 2 is player-actionable button 210 number "0." Correspondingly, in FIG. 3A, rather than including a list of items from 0 to 9, in one embodiment the "0" button corresponds to item 10 in the list of times. However, in an alternative embodiment, the list of items could originate with item 0 or could exclude the "0" button from the display locations on the display device 104.

In using the directional set 208 of player-actionable buttons, the selected player specifies a location on the display device 104 for displaying the requested specific information. For example, the selected player may request specific information be displayed on the right-hand portion of the screen by pressing button 204. Correspondingly, as shown in FIG. 3B, the DVD video player 102 outputs various responses to the display device 104, including the requested specific information at location 305.

In some situations, the requested specific information needs the entire screen to be displayed. Thus, as an alternative to presenting various responses simultaneously on a display device 104, a series of display screens may be presented by the display device, with each display screen including an indication as to which button the screen corresponds.

Figure 4:
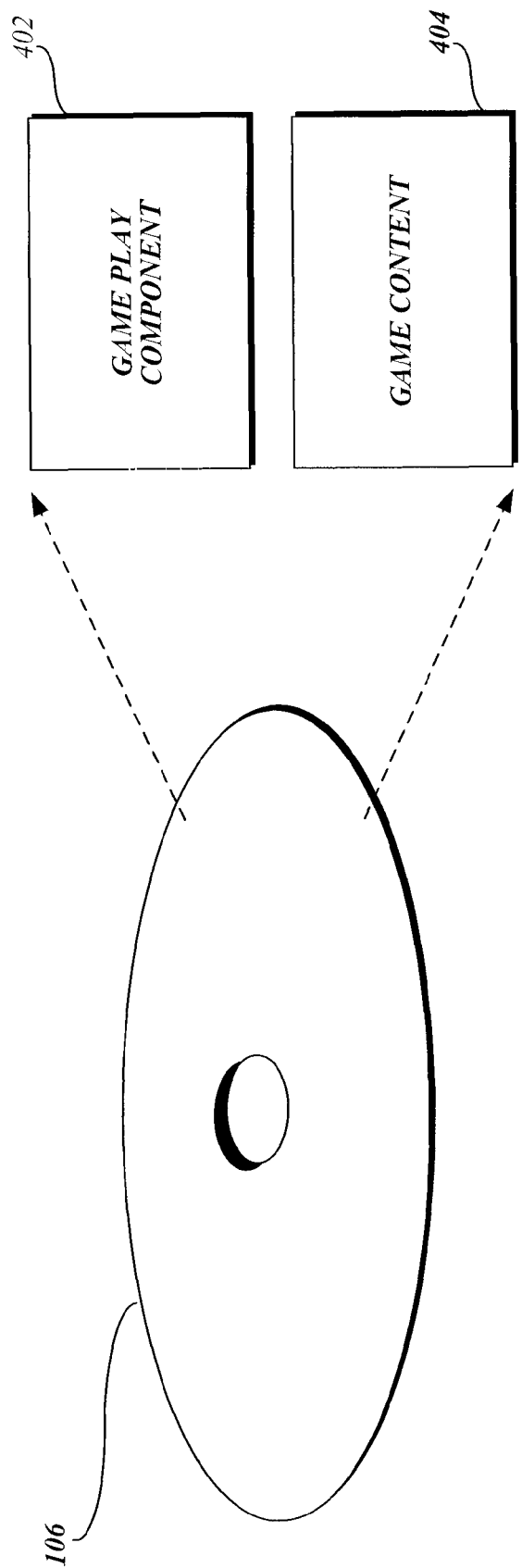
FIG. 4 is a pictorial diagram illustrating exemplary components of a DVD disc configured according to aspects of the present invention.

According to one embodiment, the subject matter of the game to be played, as well as the executable instructions for carrying out the game on the game system 100, are typically found on the optical disc or other media read by the media player. FIG. 4 is a pictorial diagram of exemplary components of a DVD disc 106 configured according to aspects of the present invention. It should be appreciated, however, that while described in terms of a DVD disc, it is an example of what is typically distributed on a variety of distributable media, such as Blu-ray and HD DVD discs, USB thumb-drives, etc., and should not be construed as limiting upon the present invention.

As shown in FIG. 4, the exemplary DVD disc 106 includes an executable component 402 as well as game content 404. The executable component 402 encompasses the instructions which, when executed by a media player, carry out the multi-player game including displaying specific information to a selected player on a commonly viewed display device 104. It should be appreciated, however, that while these two components, i.e., the executable component 402 and game content 404, are illustrated as separate items on the DVD disc 106, this is a logical separation, not necessarily a physical separation. As those skilled in the art will recognize, on a DVD video player 102, the executable instructions are embedded within the displayable/output-able content, frequently as pre-output or post-output instructions. Of course, some or all of the game content 404 could be free of executable instructions, such as tables of clips and/or data for playing a game.

Figure 5:
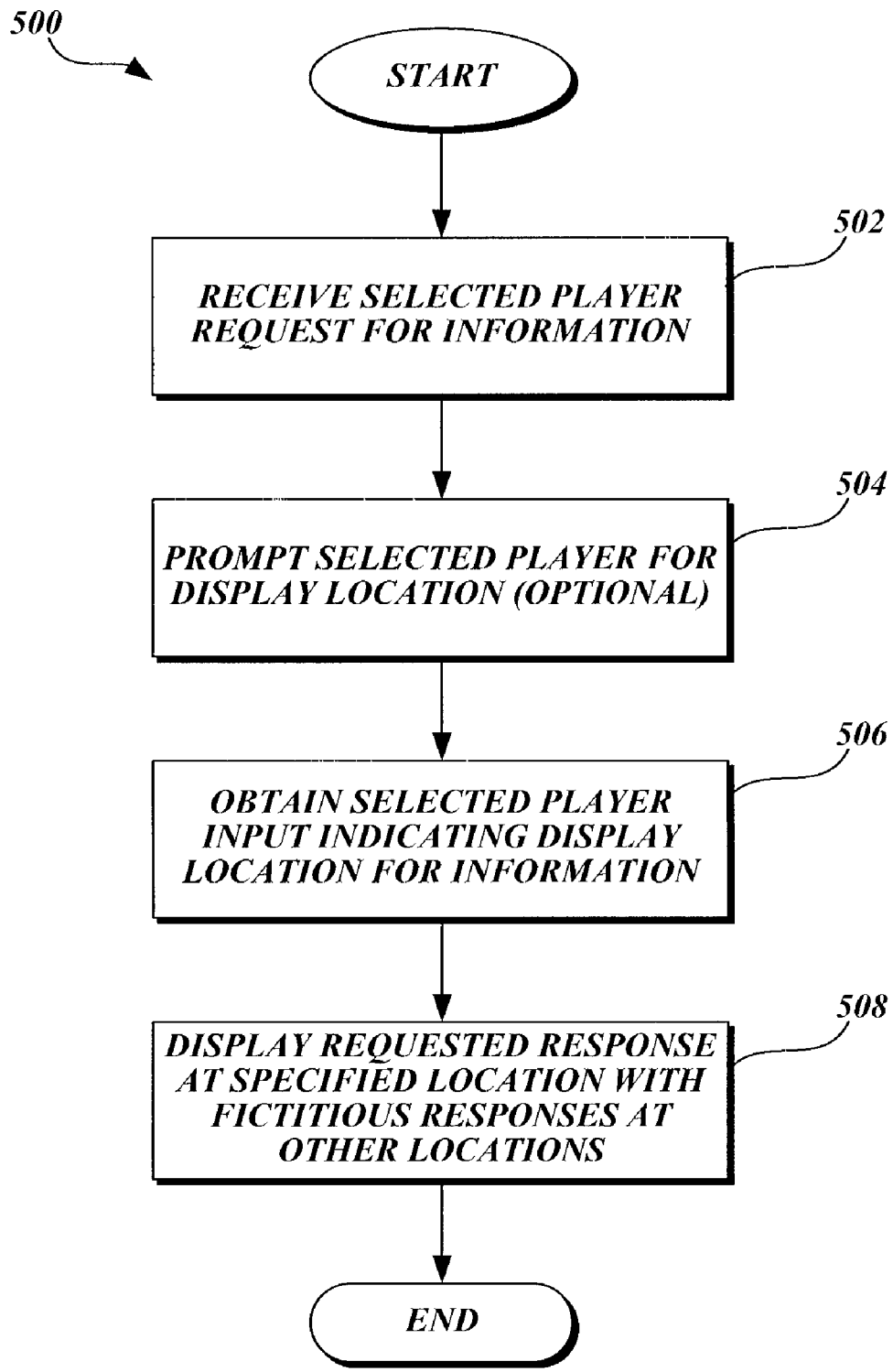
FIG. 5 is a flow diagram of an illustrative routine implemented by a media player, such as a DVD video player, for presenting specific information to a selected player on a commonly viewed display device.

Turning now to a method for outputting specific information to a selected player, FIG. 5 is a flow diagram of an illustrative routine 500, as implemented on a media player such as a DVD video player 102, for presenting specific information to a selected player on a commonly viewed display device 104. Of course, it should be appreciated that this routine 500 is executed in the context of a game being played by multiple players.

Beginning at block 502, a request is received to output specific information to a selected player on a commonly viewed display device 104. This information is intended to be delivered to the selected player, not all of the multiple players viewing the display device 104. Accordingly, at block 504, the media player 102 optionally prompts (typically by outputting a prompt on the display device 104) for the selected player to specify a display location for outputting the requested information.

On the selected player's part, the selected player provides information to the media player 102 for identifying one of a plurality of locations for displaying information on the display device 104. Ideally, the selected player provides the information in a manner that is not detectable, or readily detectable, by the other players. By discreetly identifying a location for displaying the requested information, and by providing other information with the requested information, the requested information can be provided to the selected player without its being disclosed to the other players.

At block 506, the media player 102 obtains the selected player's input specifying the display location for outputting the requested information. Correspondingly, at block 508, the requested information is output for display at the specified location along with other information, such as fictitious responses at other locations. Thereafter, the routine 500 terminates.

In order to better appreciate the benefits of being able to deliver information to a selected player on a commonly viewed display device, an example of how it might be accomplished is now presented. The example includes a search-and-destroy type game where the goal of the various players is to locate the exact locations of certain targets placed within a grid. For illustration purposes, FIG. 6 is a pictorial diagram illustrating an exemplary grid 600 with various targets placed in that grid for the players to locate. Each target in the grid 600, such as target 602, occupies one or more spaces, such as spaces 610-612, within the grid, and a player "destroys" the target by identifying each location of that target on the grid. The location of the various targets, including targets 602-610, are determined by the media player at an initialization point of the game, and finding the extents of all targets within the grid 600 constitutes winning the game.

Figure 7A:
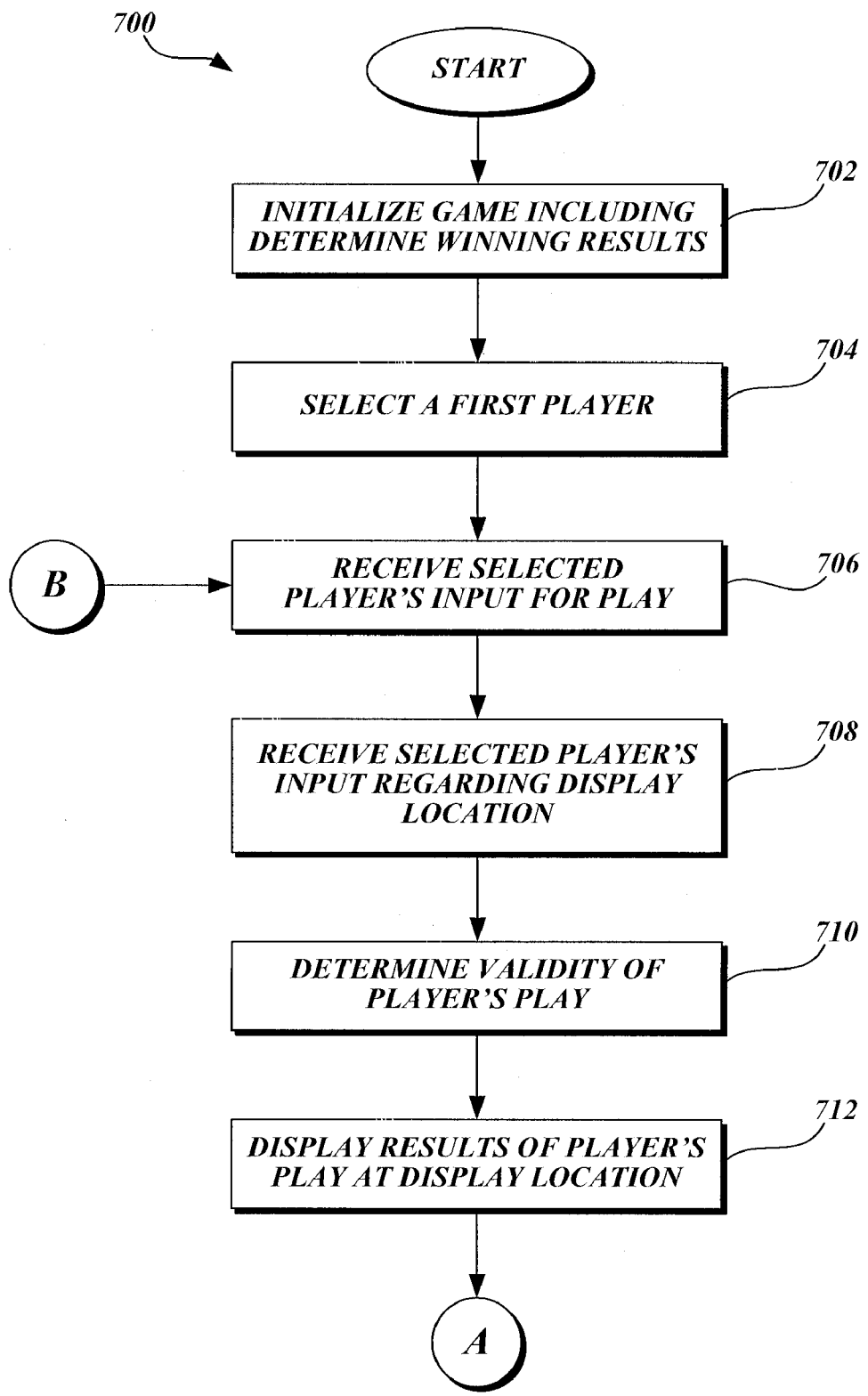
FIGS. 7A and 7B are a flow diagram of an illustrative routine implemented by a media player connected to a commonly viewed display device, such as a DVD video player connected to a display device, for conducting a search-and-destroy type game for multiple players.

To continue the description of an exemplary game, reference will be further made in regard to FIG. 7, which is a flow diagram illustrating an exemplary process for conducting a search-and-destroy game on a media player having a commonly viewed display device. Beginning at block 702, according to instructions found on media read by the media player, the media player initializes the game, including determining a set of information corresponding to the winning results, or solution, for the game. In this example, the winning results are the locations of the various targets located in the grid, such as targets 602-610 as shown in FIG. 6.

Once the winning results have been established and stored, play continues with each participating player taking a turn. Thus, at block 704, a first player is selected. Selection of the players may be conducted by the media player, or more simply, maintained by the players themselves. At block 706, the media player receives input from the selected player, e.g., the selected player's guess location of a target in the grid. At block 708, the media player also receives the selected player's input as to the display location for indicating whether or not the selected player's guess corresponds to a location of a target.

At block 710, the media player determines whether or not the selected player's guess corresponds to the display location of a target. At block 712, the media player responds with the correct answer at the identified display location. Additionally, the media player outputs other information, typically incorrect answers, at other display locations such that the other players cannot determine the answer from the media player. In one embodiment, the media player will provide information at four different display locations corresponding to the arrow buttons on the remote control device. Moreover, the media player will always output one "hit" answer and three "miss" answers. If the selected player's guess corresponds to a target location, the "hit" answer is displayed at the player-specified location. Otherwise, a "miss" answer is displayed at the specified location and the one "hit" answer is randomly selected for display among the remaining three locations.

Figure 7B:
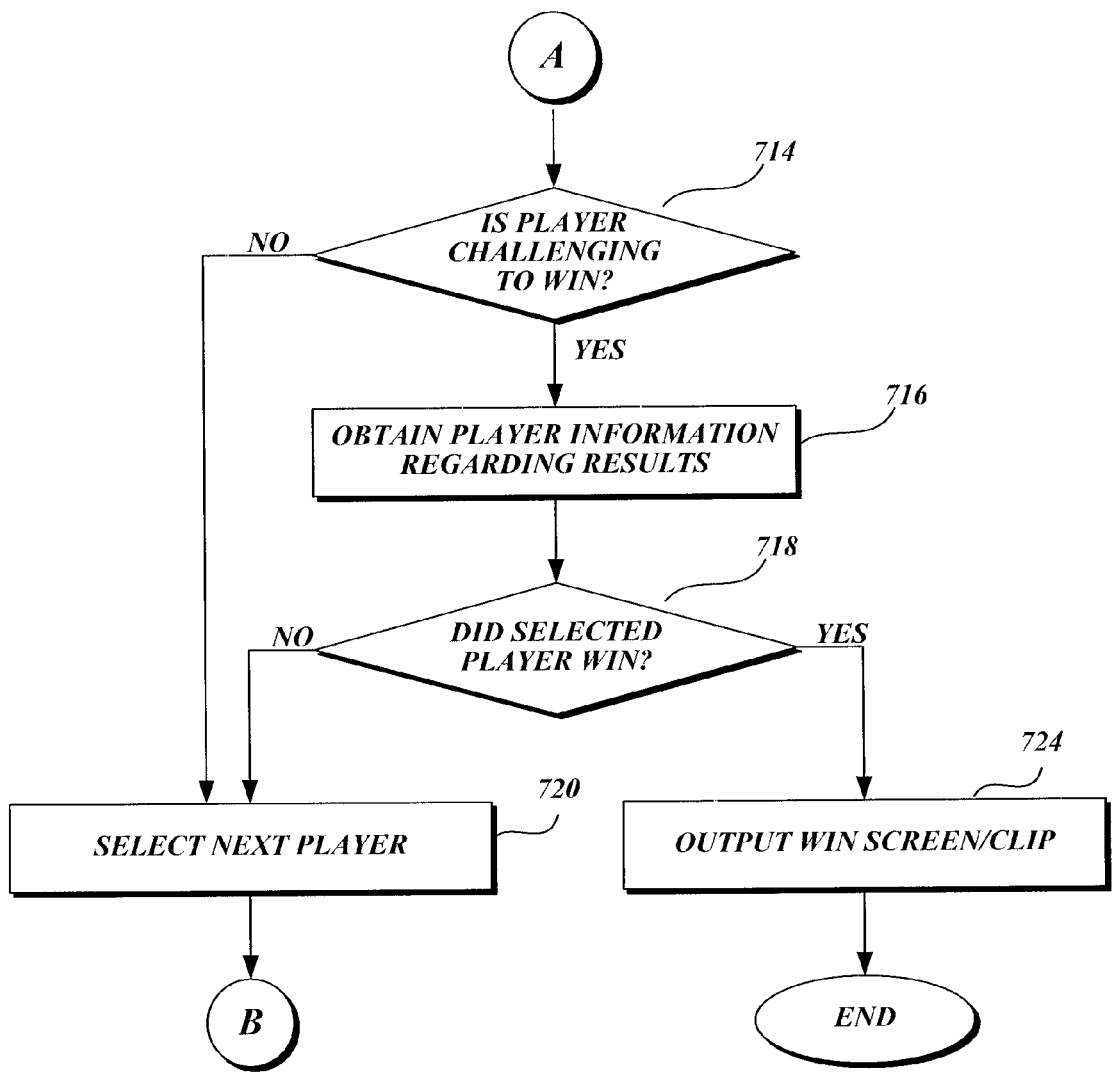

According to the described game, after the player receives the information from the media player (as displayed on the commonly viewed display device), the selected player may optionally claim that he or she has solved the game or pass the turn to next player. As shown in FIG. 7B, at decision block 714, the media player determines whether or not the player has requested to solve the game. If so, at block 716, the media player receives the selected player's information (typically via the remote control device) as to what he or she believes are the locations of the various targets in the grid. At decision block 718, the media player determines whether or not the provided information is correct, i.e., did the player win? If the information is correct, at block 724 the media player outputs a winning screen and/or a clip indicating that the selected player has won the game. Thereafter, the game ends. Otherwise, in one embodiment, the selected player is disqualified (loses) and play resumes with other players.

If the selected player did not try to win, or did not win, the game proceeds to block 720 where the next player is selected. Thereafter, the game returns to block 706 where play continues as described above, until a player wins the game.

The above game is presented as just one example of how displaying information to a selected player on a commonly viewed display device can be used. Those skilled in the art will appreciate there are numerous variations and uses that can take advantage of the various benefits associated with displaying information to a selected player on a commonly viewed display device. Thus, the illustrated game should not be construed as limiting upon the present invention.

While various embodiments have been illustrated and described, it will be appreciated that various changes can be made therein without departing from the spirit and scope of the invention.

What is claimed is:

1. A method executed in DVD Video format on a DVD video player for presenting information to a selected participant in a multi-participant game on a commonly viewed display device, the method executed in response to an input device for the DVD video player controlled by the selected participant, the method comprising:

receiving from the selected participant, via the input device, a request for information corresponding to a solution to a current game;

obtaining from the selected participant, via the input device, input identifying a display location from a plurality of display locations for displaying the requested information on the commonly viewed display device; and outputting from the DVD video player for display on the commonly viewed display device a plurality of responses, including the requested information and other information which is not the requested information, wherein the identified display location outputs a response including the requested information while the rest of the plurality of display locations outputs responses including the other information.

2. The method of claim 1, wherein the input device is a remote control associated with the DVD video player.

3. The method of claim 2, wherein the remote control associated with the DVD video player comprises a plurality of player-actionable buttons, and wherein at least a set of the player-actionable buttons corresponds to the plurality of display locations on the commonly viewed display device.

4. The method of claim 3, wherein the plurality of display locations includes a left, up, right, and down display location, and wherein the player-actionable buttons include left, up, right, and down actionable buttons that correspond to the left, up, right, and down display locations.

5. The method of claim 3, wherein the plurality of display locations includes ten display locations, and wherein the player-actionable buttons include ten player-actionable numbered buttons corresponding to the ten display locations.

6. The method of claim 1, wherein obtaining from the selected participant input identifying a display location from a plurality of display locations comprises receiving input from the selected player via a manner not readily detectable by other players.

7. The method of claim 1 further comprising repeating the steps of receiving a request for information, obtaining input identifying one of a plurality of display locations, and displaying a plurality of responses on the display device, at least once for at least two participants including the selected participant.

8. A game system comprising:
a DVD video player coupled to a display device simultaneously viewable by a plurality of participants; and
a DVD video player-readable medium having an executable component in DVD Video format for execution on the DVD video player such that when executed on the DVD video player, configures the DVD video player to carry out steps of a multi-participant game including:
receiving a request for information from a selected participant of a plurality of participants commonly viewing the display device;
obtaining input from the selected participant specifying one of a plurality of display locations on the display device for outputting the requested information; and
outputting a plurality of responses for display on the commonly viewed display device, each response output for display at a different display location, including outputting the requested information for display at the specified display location while outputting other information including fictitious responses at the remaining display locations.

9. The game of claim 8 further comprising a remote control including a plurality of player-actionable buttons for providing input to the DVD video player.

10. The game of claim 8, wherein the display device is a television.

11. The game of claim 8, wherein the DVD video player includes a plurality of player-actionable buttons for providing input to the DVD player.

12. The game of claim 8 further comprising:
a game board;
a plurality of participant identification pieces; and
a set of objects containing properties and placed within a plurality of locations.

13. The game of claim 8, wherein the DVD video player-readable medium is an optical disc.

14. The game of claim 8 further comprising a plurality of notepads for each of a plurality of participants to record information regarding the game.

15. The game of claim 14, wherein the plurality of notepads include printed material corresponding to the game for assisting the plurality of participants to record information regarding the game.

16. The game of claim 15 further comprising a plurality of notepad covers for assisting each participant to maintaining the recorded information secret.

17. The game of claim 8, wherein the DVD video player is further configured to determine a set of information corresponding to the solution to the game.

18. A tangible readable medium containing executable instructions in DVD Video format suitable for execution on a DVD video player which, when executed, configure the DVD video player to:
initialize a set of information identifying the solution to a current game;
receive input from a selected participant of a plurality of participants requesting information corresponding to the solution of the current game;
receive input from the selected participant identifying one of a plurality of display locations for outputting the requested information to the selected participant; and
upon receipt of the input from the selected participant, output a plurality of responses to the commonly viewed display device, each response output to the display device for display at a different display location, including outputting the requested information for display at the specified display location, wherein the plurality of responses includes responses that are different from the solution of the current game.

19. The readable medium of claim 18 wherein the DVD video player is configured to repeat the elements of receiving input requesting information, receiving information identifying a display location, and outputting a plurality of response until one of the selected participants correctly determines the solution to the current game.

* * * * *